S. C. SENN.
COTTON CHOPPER.
APPLICATION FILED SEPT. 26, 1912.

1,057,462.

Patented Apr. 1, 1913.

S. C. Senn, Inventor

Witnesses by _____, Attorneys

UNITED STATES PATENT OFFICE.

SAMUAL C. SENN, OF TENNELLE, ALABAMA.

COTTON-CHOPPER.

1,057,462.  Specification of Letters Patent.  Patented Apr. 1, 1913.

Application filed September 26, 1912. Serial No. 722,542.

*To all whom it may concern:*

Be it known that I, SAMUAL C. SENN, a citizen of the United States, residing at Tennelle, in the county of Pike and State of Alabama, have invented a new and useful Cotton-Chopper, of which the following is a specification.

This invention relates to cotton choppers, its object being to provide a simple and compact device of this character which can be readily manipulated and which utilizes a series of chopping hoes or blades adapted to rotate in a vertical plane extending transversely of the path of movement of the machine, said hoes receiving motion from one or both of the supporting wheels of the machine.

A further object is to provide a machine of this character having means whereby the draft animals can travel along either side of the row being chopped.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
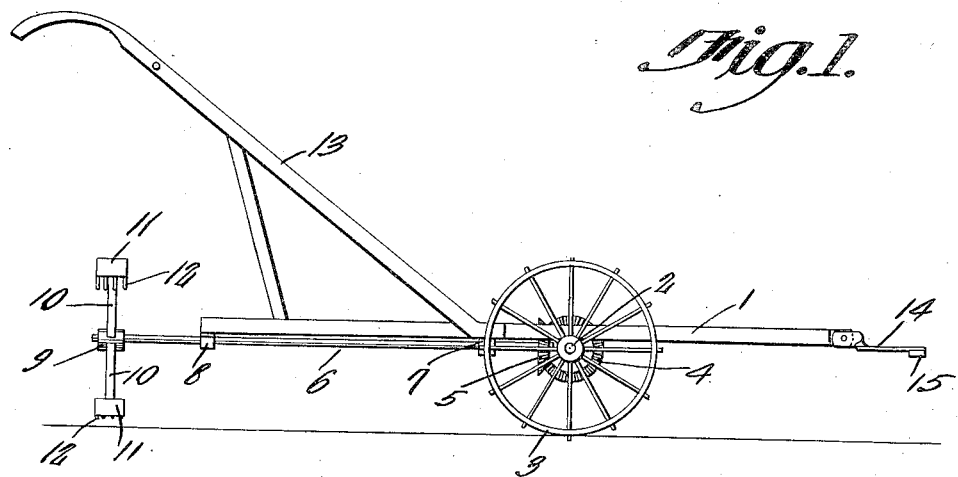
Figure 2:
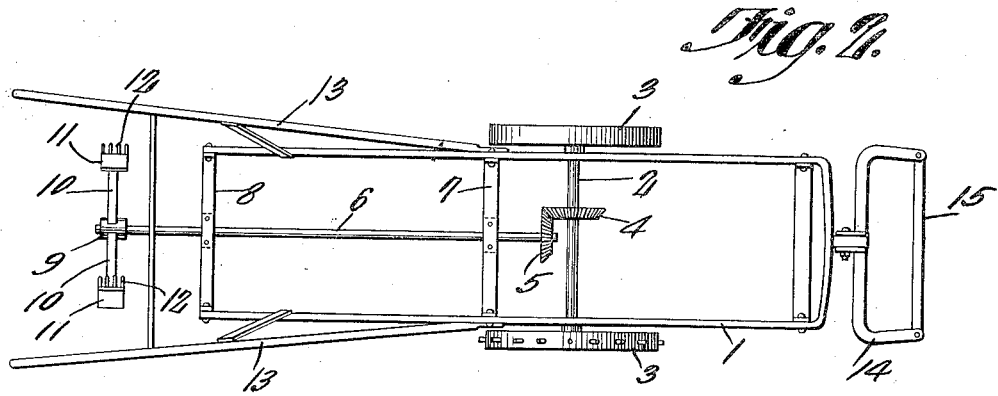
Figure 3:
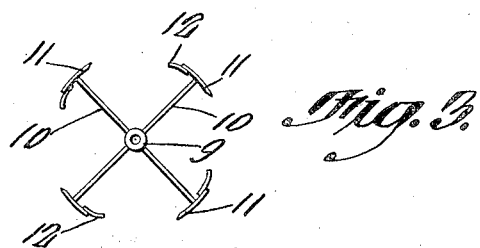

In said drawings:—Figure 1 is a side elevation of the machine. Fig. 2 is a plan view thereof. Fig. 3 is an end view of the hoes.

Referring to the figures by characters of reference 1 designates the main frame of the machine, the same being mounted upon a revoluble axle 2 which, in turn, is supported by wheels 3 one or both of which may be fixedly connected to the axle 2 so as to rotate it. A gear 4 is secured to and rotates with axle 2 and meshes with another gear 5 secured to the front end portion of a shaft 6. This shaft extends longitudinally of the frame and is journaled within a cross strip 7 and within one end strip 8 of the frame. Shaft 6 extends rearwardly beyond the frame and is provided, at its rear end, with a hub 9 from which extend radial arms 10. Each of these arms is provided, at its outer end, with a hoe or blade 11 from the rear or back edge of which extends a series of fingers 12. All of the blades are equidistant from the shaft and the blades are also equidistant from each other. Handles 13 extend upwardly and rearwardly from the sides of frame 1 and connected to the front end of the frame is a clevis 14 having an elongated bar 15 to which the draft animal may be attached. As this bar is of considerable length it will be apparent that the draft animal can travel along either side of the row being chopped.

In using the machine, the same is drawn along the row to be chopped, the wheels 3 traveling at opposite sides of the row. Motion is transmitted to axle 2 from one or both of the wheels 3 and shaft 6 will thus be rotated so as to cause the blades or hoes 11 to come successively into position to chop plants from the row. As the machine is moving forward during the rotation of the shearing hoes or blades, it will be seen that certain of the plants in the row will be left standing while the intermediate plants will be chopped out.

Importance is attached to the fact that the machine is very simple and compact in construction and may be easily manipulated. By reason of the few parts employed in the construction of the machine, the device will not easily get out of order and the power required to operate it is reduced to the minimum.

What is claimed is:—

In a cotton chopper the combination with a wheel supported structure, a shaft and means for rotating the shaft, of arms extending radially from the shaft, hoes upon the ends of the arms, and parallel fingers extending from the rear ends of the hoes and constituting continuations thereof.

In testimony that I claim the foregoing as my own, I have hereto affixed my signature in presence of two witnesses.

SAMUAL C. X SENN.

Witnesses:
J. F. HIGHTOWER,
F. C. BASS.

Copies of this patent may be obtained for five cents each, by addressing the "Commissioner of Patents, Washington, D. C."